United States Patent
Russ et al.

(10) Patent No.: US 9,089,913 B2
(45) Date of Patent: Jul. 28, 2015

(54) MACHINE TOOL FOR INCORPORATING GEAR TEETH INTO THE INNER SIDE OF AN ANNULAR WORKPIECE

(75) Inventors: Erich Russ, Gremsdorf (DE); Lothar Seifert, Adelsdorf (DE); Oliver Gold, Nuremberg (DE)

(73) Assignee: IMO Holding GmbH, Gremsdorf (DE)

( * ) Notice: Subject to any disclaimer, the term of this patent is extended or adjusted under 35 U.S.C. 154(b) by 1096 days.

(21) Appl. No.: 12/989,723

(22) PCT Filed: Apr. 28, 2009

(86) PCT No.: PCT/EP2009/003079
§ 371 (c)(1),
(2), (4) Date: Nov. 16, 2010

(87) PCT Pub. No.: WO2009/132819
PCT Pub. Date: Nov. 5, 2009

(65) Prior Publication Data
US 2011/0058911 A1  Mar. 10, 2011

(30) Foreign Application Priority Data

Apr. 28, 2008 (DE) .......................... 10 2008 021 238

(51) Int. Cl.
*B23C 3/30* (2006.01)
*B23F 23/12* (2006.01)
*B23F 23/00* (2006.01)

(52) U.S. Cl.
CPC ................. *B23F 23/12* (2013.01); *B23F 23/00* (2013.01); *B23C 3/30* (2013.01); *B23C 2270/18* (2013.01);
(Continued)

(58) Field of Classification Search
CPC .. B23C 3/30; B23C 2220/36; B23C 2270/18; B23Q 1/015

USPC .......... 409/25, 27, 38, 50, 52, 143, 164, 168, 409/185, 189, 190, 191, 235; 269/56, 57, 269/58, 63, 77, 287; 74/813 R, 813 L
See application file for complete search history.

(56) References Cited

U.S. PATENT DOCUMENTS

| | | | | |
|---|---|---|---|---|
| 2,921,505 | A | * | 1/1960 | Hoglund ........................ 409/191 |
| 3,260,140 | A | * | 7/1966 | Burge ............................. 82/122 |

(Continued)

FOREIGN PATENT DOCUMENTS

| | | |
|---|---|---|
| DE | 1 002 593 B | 2/1957 |
| DE | 199 46 424 A1 | 4/2001 |

(Continued)

OTHER PUBLICATIONS

EPO Machine Translation—Hofmann, H., "Grinding or Milling Device for Annular Internal-Tooth Gear Wheels has Tool Stand and/or Holder on Theoretical Cylindrical Surface within Machining Radius about Axis," Jul. 15, 2004.*

*Primary Examiner* — Daniel Howell
*Assistant Examiner* — Michael Vitale
(74) *Attorney, Agent, or Firm* — Pandiscio & Pandiscio (57) ABSTRACT

A machine tool for machining gear teeth into an inner side of an annular workpiece, the tool comprising a circular substructure having an upper side, a rotary bearing on which is disposed an annular machining table adapted to support a workpiece, a chassis for supporting a tool head, and a plurality of exchangeable machining rings, an adaption ring supporting the machining ring and supporting concentric cones, and a braking device adapted to act on the adaption ring.

18 Claims, 4 Drawing Sheets

(52) U.S. Cl.
CPC .................. *Y10T 409/101431* (2015.01); *Y10T 409/105883* (2015.01); *Y10T 409/304424* (2015.01); *Y10T 409/307056* (2015.01)

(56) References Cited

U.S. PATENT DOCUMENTS

| | | | |
|---|---|---|---|
| 3,680,440 A * | 8/1972 | Goldshtein et al. | 409/197 |
| 3,850,051 A * | 11/1974 | Woltjen et al. | 74/821 |
| 5,779,406 A * | 7/1998 | Astor | 409/132 |
| 6,227,775 B1 * | 5/2001 | Klammer | 409/26 |

FOREIGN PATENT DOCUMENTS

| | | |
|---|---|---|
| DE | 102 59 222 A1 | 7/2004 |
| EP | 198 223 A1 | 10/1986 |
| GB | 1 219 081 A | 1/1971 |
| JP | 2000 257675 A | 9/2000 |

* cited by examiner

MACHINE TOOL FOR INCORPORATING GEAR TEETH INTO THE INNER SIDE OF AN ANNULAR WORKPIECE

BACKGROUND OF THE INVENTION (1) Field of the Invention

The invention is directed to a machine tool for incorporating gear teeth into the inner side of an annular workpiece, preferably by machining (or: metal cutting).

(2) Description of the Prior Art

The production of gear teeth on the inner side of annular objects is somewhat more difficult than the incorporation of external teeth on gear wheels or the like. In particular, various methods involving the use of a worm milling cutter for hobbing the surface to be provided with gear teeth are not possible. Rather, machining processes that are considered suitable for internal gear teeth are shaping or—in particular in the case of machining large rings—milling of the teeth by means of a milling cutter. In this case, the workpiece to be machined, still without teeth, is placed onto a table, for example in the form of a circular disk, and fixed there. The machine head is held over the inner space within the ring to be machined by means of an extension arm from a stand arranged alongside the table. By driving the machining tool—rotation of a milling head or reciprocating movement in the case of a shaping machine—one tooth after the other is incorporated, the table being turned further by an amount corresponding to the spacing between the teeth after the completion of a tooth. In the case of this procedure, the extension arm carrying the machining head represents a weak point, because the high cutting forces originating from the machining head can only be insufficiently absorbed by this extension arm and vibration of the arrangement is therefore unavoidable. Such vibration is extremely undesirable, however, because it results in inaccurate cuts.

SUMMARY OF THE INVENTION

These disadvantages of the prior art described result in the problem initiating the invention, that of developing a machine tool of the generic type in such a way that the machining forces occurring during a properly performed operation, in particular cutting forces, cannot make the machine vibrate.

The solution to this problem is achieved by an annular machining table for placing on or supporting a workpiece, in particular placed flat, and a chassis for holding, supporting, mounting and/or guiding a tool head, at least during the machining, which chassis extends through the annular machining table or through a central opening in the annular machining table from a machine bed (or: bed) or pedestal below the machining table of the machine.

The fact that the machining head is connected in such a way to the machine bed or pedestal by the shortest route, that is through a central opening in the machine table, allows even higher machining forces, in particular cutting forces, to be diverted without any problem into the bed or pedestal of the machine, without any appreciable vibrations being induced as a result. This is so since, by contrast with a freely projecting extension arm as in the prior art, the chassis according to the invention of the machining head can be formed so as to be extremely solid, and consequently extremely rigid.

It has proven to be favorable that the machining table is mounted rotatably about a vertical axis of symmetry. This avoids rotation of the chassis together with the machining head, which further increases the accuracy with which it is guided. On the other hand, the annular tool table can for its part be mounted extremely precisely, so that a workpiece fixed on it concentrically in relation to the axis of rotation does not undergo any radial offset during its rotation and the machining can therefore be performed with extremely high precision.

In an advantageous embodiment it is envisaged to mount the machining table on the upper side of a substructure, preferably approximately in the form of a lateral surface. In simple terms, this substructure (or: lateral surface or substructure in the form of a lateral surface) preferably offers sufficient space in its interior for the machining head together with the carrying chassis thereof and, possibly, a carriage supporting the two. The substructure may also have large-area clearances, on the one hand as access to the interior, but on the other hand also to allow the machining head, chassis, etc. to be adjusted or moved, possibly even within wide limits. In order for such an interruption in the substructure not to overly weaken its stability, the height of such clearances is preferably chosen to be smaller than the height of the substructure in the form of a lateral surface, so that a web defining the circumference of the substructure still remains above and/or below the clearance.

In a way corresponding to the table to be supported, for instance in the form of a circular ring, its substructure may have in the region of its upper side a clearance, preferably with a cross section in the form of a circular ring, in particular with a clear diameter corresponding to the inside diameter of the rotary connection, in order to obtain a maximum path of movement. The substructure is capable of supporting the table along its entire circumference without any gaps, thereby eliminating the possibility of sagging under the weight of one or more workpieces lying on it.

It is advantageous if the substructure has at the upper side a cross section in the form of a circular ring and/or a circular outer contour in cross section, and consequently is well adapted in form to the machining table. The cross section is preferably considered in a sectional plane perpendicular to the vertical direction and/or gravitational force or perpendicular to the axis of rotation.

On the other hand, the substructure for the machining table may have in the region of its base an approximately or at least almost polygonal, preferably quadrangular or rectangular, in particular approximately square, cross section or an approximately or at least almost polygonal, in particular quadrangular or rectangular, in particular approximately square, outer contour in cross section.

The quadrangular or rectangular geometry is advantageously adapted to the fact that the chassis together with the machining head should be displaceable in a radial direction, with respect to the axis of rotation of the machining table, in order to place the machining tool, for example a milling cutter, against a workpiece from the inside. Such a displacement requires a tunnel-like construction with side edges parallel to one another and, preferably, with short guiding rails, approximately of the same length. The same define a quadrangle or are directed orthogonally in relation to one another, so that the two mutually orthogonal directions of displacement and the corresponding guiding elements or guiding rails are preferably aligned along the side edges of the quadrangular or rectangular base of the inner structure and the configuration of the inner space within the substructure is correspondingly adapted.

In particular for reasons of optimum statics, with greatest possible flexural rigidity, it is preferred if the cross section of the substructure for the machining table steadily changes between its upper side, on which the machining table is mounted, on the one hand, and its base, which is arranged on or toward the machine bed, on the other hand. In particular, the circular outer contour of the substructure and/or its cross section at the upper side steadily goes over into the quadrangular or rectangular, in particular square, outer contour of the substructure and/or its cross section at its base.

This may be achieved in the first embodiment by the lateral surface or the outer surface of the substructure extending approximately vertically in the region of four points of its circular upper edge that are respectively offset by 90° from one another to the underside or base of the substructure, that is to say with a maximum slope or maximum angle of slope $\phi_{max}$ with respect to the horizontal base area of approximately 90°.

These regions of the underside or base may respectively form the side midpoints of four edges of a square underside or base of the lateral surface. By contrast, a vertical section through the lateral area along the axis of rotation of the annular area at the upper side on the one hand and through one of the four corners of the square on the other hand has a minimum slope or minimum angle of slope $\phi_{min}$; this slope or angle of slope lies, for example, between 40° and 80°, in particular between 50° and 70°. Between these eight lines, which are offset with respect to one another by 45° in each case with respect to the axis of rotation of the machining table, the angle of slope $\phi$ respectively varies between $\phi_{min}$ and $\phi_{max}$, according to $\phi_{min} \leq \phi < \phi_{max}$.

In other words, the wall or outer area of the substructure extends (i) at least almost vertically or at a maximum angle of slope in the region of four outer points on the at least almost circular upper side that are respectively offset by 90° from one another to the base of the substructure, in particular in each case to the side midpoint respectively of one of four edges of the rectangular or square base, (ii) at at least a minimum angle of slope in the region of four further inner points on the at least almost circular upper side that lie respectively between two of the outer points in the circumferential direction to the base of the substructure, in particular in each case to an associated corner of the rectangular or square base, and (iii) at varying angles of slope, between the maximum angle of slope and the minimum angle of slope, in the circumferential direction between the outer points and the inner points.

The edge length of the square preferably corresponds approximately to the diameter of the upper side in the form of a circular ring. Therefore, in particular, the circle at the upper side of the substructure forms in the projection onto the base an inscribed circle in the square at the base of the substructure, which therefore has the same center point as the square and tangentially touches the side edges of the square at their midpoint.

In another, second embodiment, the lateral area or outer area of the substructure may also be made up of four planar and/or vertical wall portions or side walls, which at the base of the substructure or lateral surface meet the edges of the quadrangle or square there, and of four vaulted portions or curved, preferably convexly curved, i.e. outwardly vaulted, intermediate walls that join the four planar and/or vertical wall portions or side walls to one another. The vaulted portions or intermediate walls narrow toward the base and/or end in the form of a point in its corners and/or widen upwardly toward the upper side and/or finally come together in the region of the upper side, or merge with one another, in particular if the side walls, in particular vertical side walls, narrow there to a point of the wall.

In particular, from each point of the upper side, and also from each point of the base of the substructure, there extends in each case a straight line, which extends along the lateral surface to the respectively opposite end face of the lateral surface—the underside or the upper side. In this case, all such lines extending from the edges of the square converge upward to the point of the side wall concerned, where they all meet, like the lines running from the base of an (isosceles) triangle to the apex thereof. In turn, all the lines extending from a circumferential region of the upper side that lies between two adjacent points of these four points converge to a corner in each case of the base quadrangle, in a way corresponding to a piece of the lateral area of an (oblique) inverted cone, the apex of which does not lie above or below the base area but laterally outside the same. Accordingly, the lateral area is preferably made up of an alternating succession of upright, preferably isosceles, triangles and, in between in each case, a lateral portion of an inverted, preferably oblique, cone, an edge line of a triangle portion respectively coinciding with an edge line of a cone portion.

It is within the scope of the invention that the chassis for holding, supporting, mounting and/or guiding a tool head has a horizontally movable carriage. The carriage track is preferably defined by one or more guiding rails, which is/are anchored on the machine bed or pedestal. If there is only a single rail, it should run through the axis of rotation or through the center point of the base quadrangle; two rails may extend symmetrically on both sides of this center point. This railway is preferably bounded at two end faces, one of which lies within the enclosure in the form of a lateral surface, the other lies outside it. In the region of this or these guiding rail(s), the substructure in the form of a lateral surface is interrupted, so that the carriage can, at least partly, be moved out of the substructure and back.

The invention can be developed to the extent that the chassis for holding, supporting, mounting and/or guiding a tool head has a vertically movable carriage. While the horizontally movable carriage serves for adjusting the milling or machining head, the latter is lifted or lowered by means of a vertically movable carriage, in order to produce straight gear teeth with constant tooth cross sections along the axis of rotation.

The fact that the vertically movable carriage is guided on the horizontally movable carriage allows the machining head to be adjusted along a vertical plane with predefined limits. In this case, the vertical carriage moves up and down within the clearance in the machining table, while the horizontal carriage is moved on its guiding rails to a greater or lesser extent into the inner space of the substructure in the form of a lateral surface. For this purpose, the horizontal carriage is lower than the substructure, so that it fits under the machining table; the vertical carriage is more slender than the clearance within the machining table, in order that it can move through this clearance.

Also provided are retaining devices, in particular brakes, for fixing the horizontally movable carriage during machining. Serving primarily as the machine tool is a milling tool, which is preferably arranged, in particular mounted, on a milling head in the form of a vertically movable carriage. This may preferably be a disk-shaped body with cutting teeth arranged on its circumference, the geometry of which teeth is fixed such that an axial cut by one tooth of the tool corresponds approximately to the cross section of the gap between two adjacent teeth of the internal gear teeth to be milled in.

Such a milling tool should be mounted rotatably about a horizontal axis in such a way that the planar base or a main area of the disk-shaped tool body is vertically oriented, preferably approximately radially with respect to the axis of rotation of the machining table.

Finally, it corresponds to the teaching of the invention that the axis of rotation of the milling tool, the direction of displacement of the vertically movable carriage and the direction of displacement of the horizontally movable carriage respectively form a right angle to one another, so that the teeth of the rotating tool on the lateral area perform an approximately vertical movement in their region of engagement. This has the advantage that the forces occurring during such a cutting operation are directed approximately vertically and are therefore either absorbed from the workpiece by the horizontal table plate or—with a reversed direction of rotation of the milling cutter—are compensated entirely or largely by the weight of the workpiece to be machined. The workpiece is not displaced thereby because it is firmly clamped, since its weight alone is not sufficient here for fixing.

BRIEF DESCRIPTION OF THE DRAWINGS

Further features, details, advantages and effects on the basis of the invention emerge from the following description of a preferred embodiment of the invention and with reference to the drawing, in which.

DESCRIPTION OF THE PREFERRED EMBODIMENTS

The machine tool 1 rests on a machine bed 2 in the form of a solid base plate, which is anchored, for example firmly screwed, on a concrete pedestal or the like. The machine bed 2 has a square base area, with a continuation 3 adjoining on one side, preferably with a width reduced to approximately 70 to 90% in relation to the edge length of the square portion of the machine bed 2. The continuation 3 is intended to allow the horizontal movement of a carriage 20 and is therefore dependent in its length on the required path of movement of this carriage 20 in the horizontal direction.

Rising up above the square main portion 4 of the machine bed 2 is a substructure 5 in the form of a lateral area for the actual, rotatably arranged machining table 6. For this purpose, the substructure 5 has an upper side 7 in the form of a circular ring, on which the actual machining table 6, likewise in the form of a circular ring, rests by means of a rotary bearing 8. The outside diameter of the upper side 7 corresponds approximately to the outside diameter of the machining table 6.

The base area 9 of the substructure 5 in the form of a lateral area corresponds to the base area of the main portion 4 of the machine bed 2, so that the substructure can be fixed by means of machine screws passing partially through the machine bed 2. Provided for this purpose in the lower region of the substructure 5 and in the machine bed 2 are clearances 10, in which screw heads, nuts or other threaded elements are accessible. The substructure 5 could, however, also be firmly welded on the machine bed 2.

Between its upper side 7 and its base area 9, the cross section of the substructure 5 goes over steadily and continuously from the approximately cylindrical form at the upper end into the approximately box-shaped form at its lower end. An essential feature here is the approximately constant wall thickness of the order of magnitude of between 10 cm and 40 cm, preferably more than 15 cm, in particular 20 cm or more, depending on the loads to be expected and to be supported on the machining table. In particular in cases of greater wall thicknesses, it is recommendable to make the substructure take the form of two shells arranged one inside the other, with an approximately constant spacing and/or with an intermediate or hollow space possibly narrowing slightly upwardly, into which a preferably hydraulically setting composition, in particular a non-shrinking concrete, is introduced; in cases of smaller wall thicknesses, the substructure 5 could also be of a solid configuration. The substructure 5 should, however, in any event be sufficiently heavy, i.e. of high mass, to be able to dampen the vibrations originating from the machining as optimally as possible.

The continuous transition of the substructure 5 from its approximately box-shaped foot region to its approximately cylindrical head region is brought about by the substructure 5 being made up of a total of eight portions.

These include a total of four vertical walls 11, which each rise up over a side edge 12 of the square main portion 4 of the machine bed 2. Each wall 11 has the area of an isosceles triangle, the base of which corresponds to the edge length of the square main portion 4 of the machine bed 2, and the height of which corresponds approximately to the overall height of the substructure 5.

On account of the upwardly decreasing width of the walls 11, upwardly widening gaps are obtained in each case in the corner regions between every two adjacent, planar walls 11. The edge lines of adjacent walls 11 are joined by in each case a vaulted portion 13. These vaulted portions 13 respectively follow a portion of the lateral area of an inverted cone, the apex of which does not lie vertically above or below its base area, but protrudes as it were outwardly beyond the same.

Figure 1:
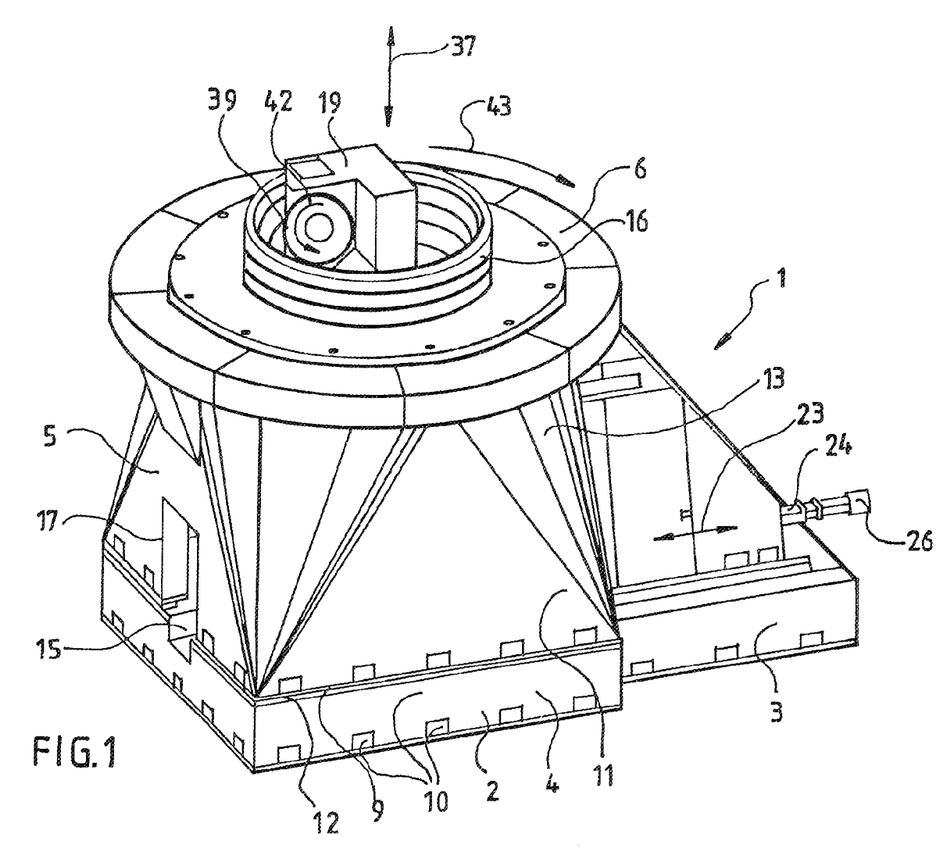
FIG. 1 shows a machine tool according to the invention in a perspective view.
Figure 2:
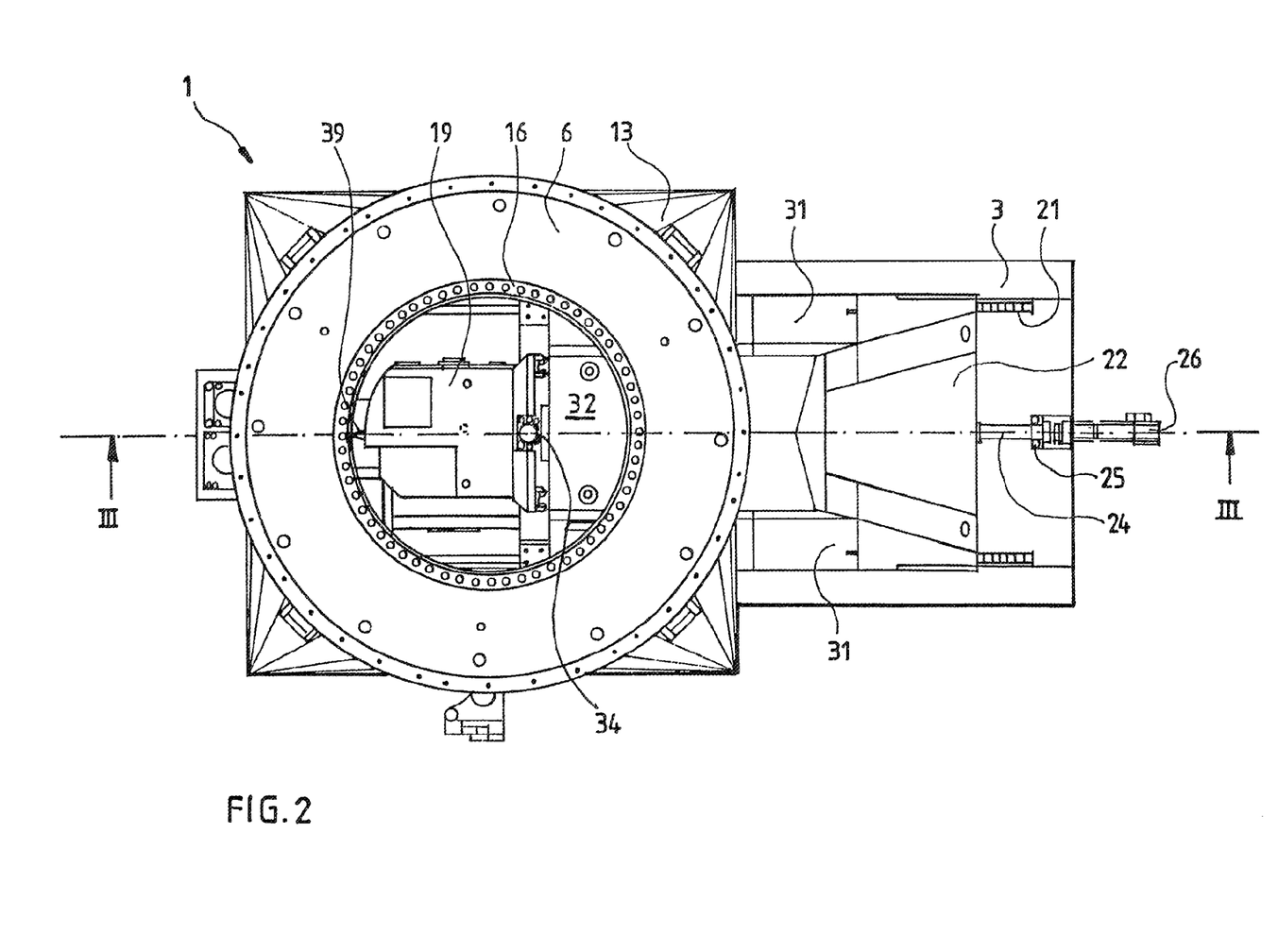
FIG. 2 shows a plan view of FIG. 1.
Figure 3:
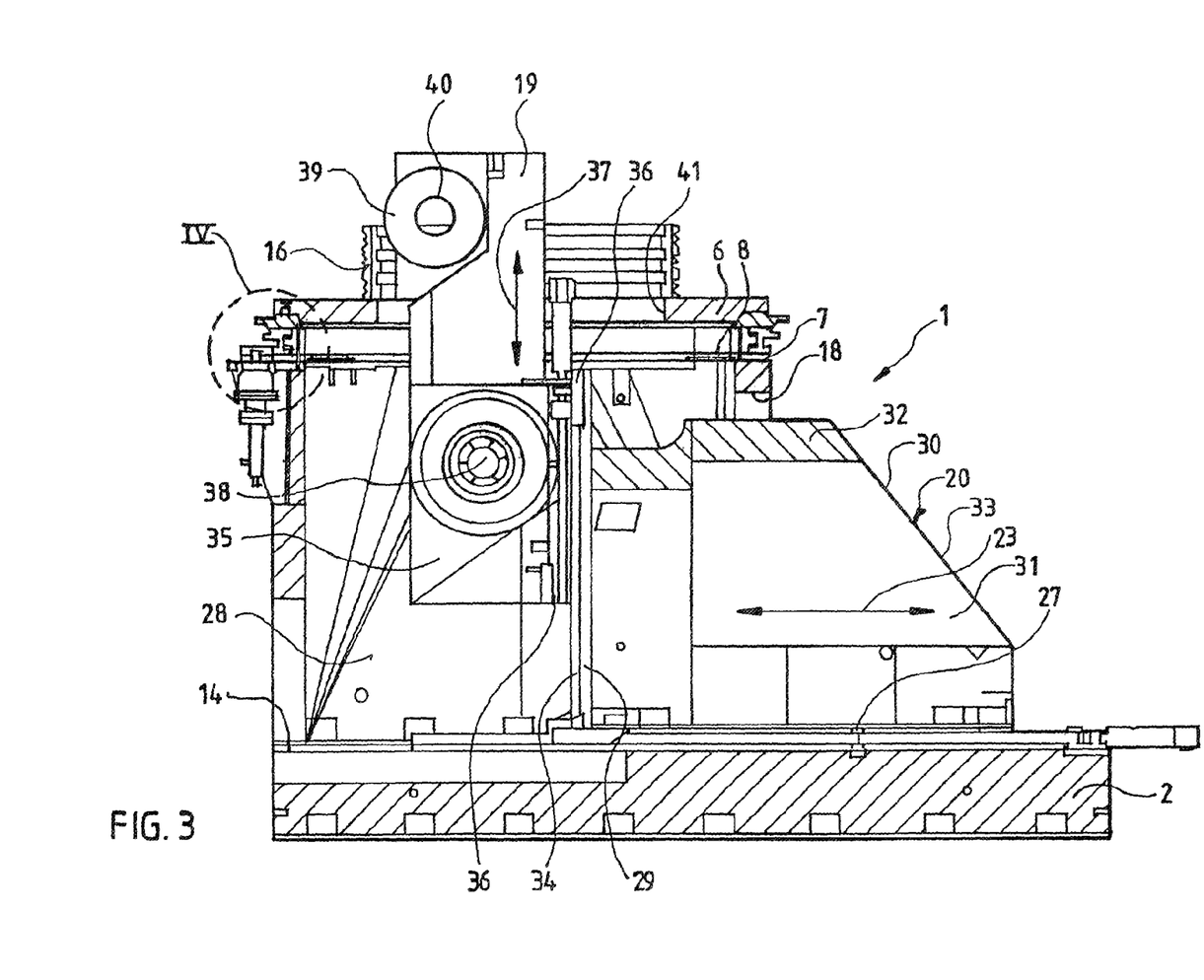
FIG. 3 shows a section through FIG. 2 along the line III - III.
Figure 4:
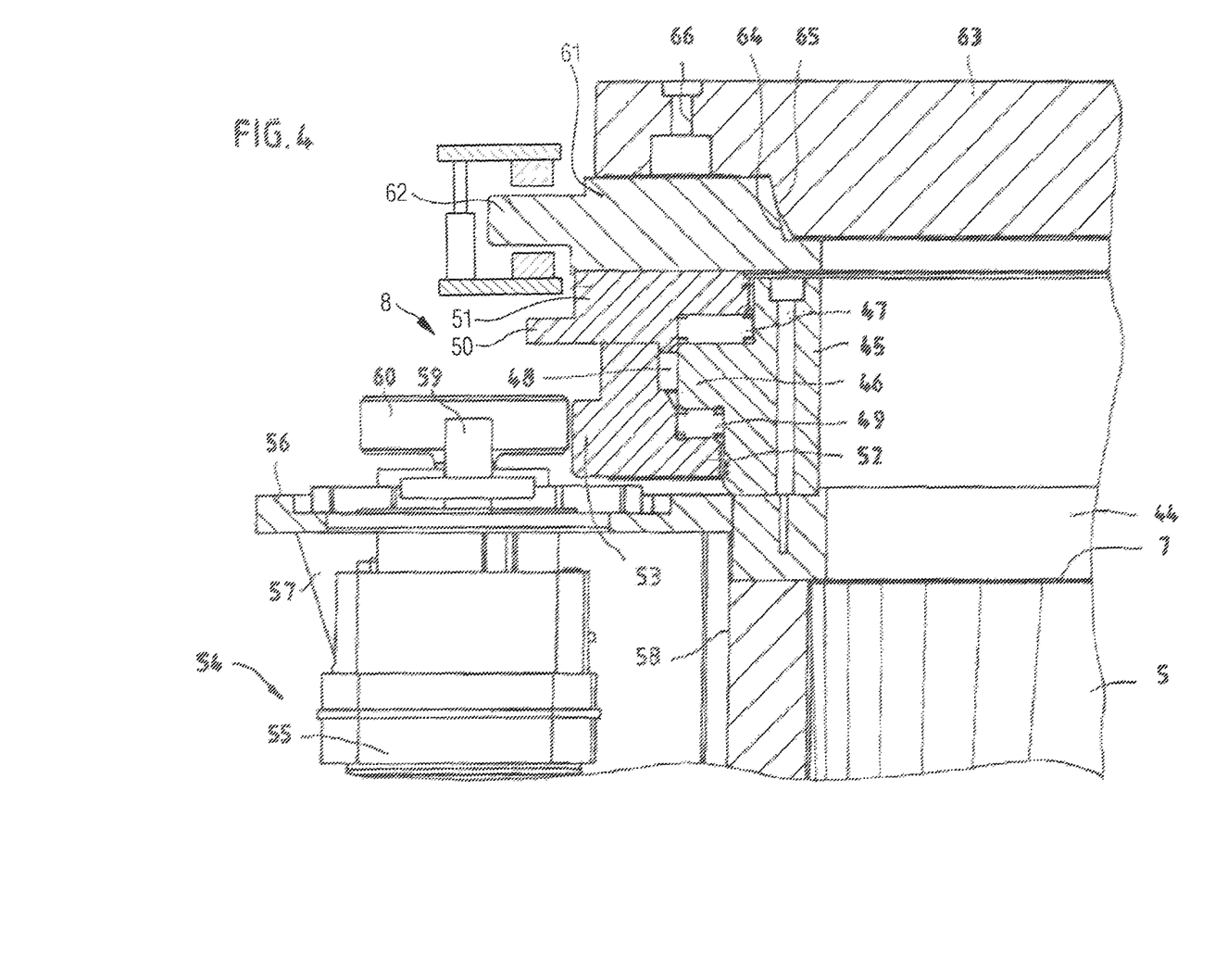
FIG. 4 shows an enlarged representation of the detail IV from FIG. 3.

As already indicated above and evident from FIG. 3, between the circular upper side 7 of the substructure 5 and the actual machining table 6 there is a rotary mounting 8. The details of this rotary mounting 8 are illustrated in FIG. 4.

It follows from this that a terminating ring 44, preferably of solid metal, rests on the upper side 7 of the substructure 5 in the form of a circular ring.

On it, the inner ring 45 of the rotary bearing 8 is fixed, in particular screwed on by means of a multiplicity of fastening screws arranged in the form of a ring, parallel to the vertical axis of rotation of the rotary mounting 8. On the outer circumference of the inner ring 45 there is a projection 46 with an approximately rectangular cross section, running around said ring in the form of a collar. This projection 46 is joined along its radially inner side to the inner ring 45, in particular is produced integrally or formed together with it, for example machined from one and the same ring by corresponding turning on a lathe. The other three sides of the projection 46 respectively form a running area for in each case one of a total of three rows of rolling bodies 47, 48, 49. The rolling bodies 47, 48, 49 are preferably in each case rollers, in particular cylindrical rollers.

The outer ring 50 of the rotary mounting 8 is subdivided into two separately produced rings 51, 52. After their assembly, the two rings 51, 52 are joined together, in particular by means of screws, and then have an approximately C-shaped cross section overall, i.e. they reach on the one hand over the projection 46 of the inner ring 45, in the region of the upper side of the upper ring 51, and on the other hand under the projection 46 of the inner ring 45, in the region of the underside of the lower ring 52. On each of the sides of the outer ring 50 that are facing the projection 46 there is a runway for the three rows of rolling bodies 47, 48, 49.

Of these, the rolling bodies 47 of the uppermost row, the axes of rotation of which point approximately radially outward from the axis of rotation of the rotary mounting 8, primarily bear the weight of the machining table 6 together with workpieces 16 lying on it.

The axes of rotation of the rolling bodies 48 of the second or—seen in the vertical direction—middle row are vertically aligned, in the manner of a radial bearing. These rolling bodies 48 undertake the precisely concentric guidance of the machining table 6 with respect to the substructure 5.

The rolling bodies 49 of the third or lowermost row are intended—possibly in interaction with the upper rolling bodies 47—to absorb tilting moments, and thereby also ensure an exact horizontal position of the machining table 6, together with workpieces 16 lying on it, at all times during machining.

For the rotational driving of the machining table 6, on the outer ring 50—preferably on its lower part 52—there is a preferably radially extended region 53 with external teeth. Meshing with these external teeth is a driven element of at least one drive 54 that is provided with teeth.

The (each) drive 54 (each) comprises an electric motor 55, which is fastened, in particularly screwed, to an outwardly protruding, plate-shaped continuation 56 on the outer circumference of the terminating ring 44 with a horizontal base area. Preferably, this plate-shaped continuation 56 with a horizontal base area is supported by a plate 57 with a vertical base area, for example a polygonal, preferably triangular or quadrangular, in particular trapezoidal, base area. This is made to abut, in particular butt-welded, with one (longitudinal) side 58 on the outer side of the substructure 5, in particular in the region of a side midpoint of the same, while its upper side extends approximately at right angles thereto, i.e. horizontally, and is in supporting contact with the plate-shaped continuation 56, preferably is connected, in particular welded or screwed, thereto.

In this case, the arrangement is made such that the (each) drive 54 has a vertically upwardly protruding driven shaft 59, rotationally fixed on which there is a gear wheel 60, which is in meshing engagement with the external teeth on the radially widened region 53 of the outer ring 50. By rotationally adjusting this gear wheel 60, the machining table 6 can be turned. A (reduction) gear mechanism may be connected between the electric motor 55 and the gear wheel 60, in order to adapt the rotational speed of the electric motor 55 optimally to the desired rotational speed of the machining table 6; this may, however, also be brought about by electronic means, for example by activating the electric motor 55 by way of a converter. With such a control device, not only the rotational speed of the electric motor 55 can be controlled, but possibly also its position or rotational position, in order to be able to take the machining table quite specifically to certain rotational positions or machining positions, which is very important for constant distances between the individual teeth of the workpiece 16. For position control, a position encoder, for example an incremental encoder, resolver or the like, may for example be arranged on the driven shaft 59 of the electric motor 55. Of course, as an alternative thereto, the rotational position of the machine table 6 itself can also be measured, for example by means of an (incremental) scale adhesively attached or otherwise fixed to the outer or inner side of the outer bearing ring 50.

Resting on the upper side of the outer ring 50 is an adaption ring 61, which is connected in a rotationally fixed manner to the outer ring 50, in particular by a series of connecting screws arranged such that they are distributed in the form of a ring. On the outer circumference of the adaption ring 61 there is a disk-shaped extension 62, which runs between the brake shoes of one or more arresting brakes. The arresting brakes - preferably distributed at equal spacings of, for example, 90° each over the circumference of the machine table 6—are fixed on the substructure 5. They may be actuated electrically or hydraulically, in order to connect the machine table 6 immovably to the substructure 5 according to the setting of a desired machining position. Before each rotational adjustment of the machining table 6 by means of the drive/drives 54, the arresting brakes are released.

The adaption ring 61 offers a standardized connection for a workpiece-specific machining ring 63 lying on it. Both rings 61, 63 are self-centering, in that they each have conically worked areas 64, 65 in the region of their mutual abutting areas. Near the inner side of the adaption ring 61 there is preferably an inner cone 64 and, at a position corresponding thereto of the workpiece-specific machining ring 63, a complementary outer cone 65. Furthermore, the adaption ring 61 has in its planar upper side a large number—for example 16—of fastening bores arranged in the form of a ring, which serve for screwing on a placed-on, workpiece-specific machining ring 63.

Different machining rings 63 are adapted, in particular with regard to their inside diameter—possibly also with regard to their load-bearing capacity or strength—to different workpieces. For connection to one or more workpieces, possibly stacked one above the other, they have on their upper side receptacles 66 for fastening means, for example in the form of threaded rods inserted through connection bores of the workpieces 16. For this purpose, the receptacles 66 may be provided with an internal thread.

Machined in the upper side 14 of the square main portion 4 of the machine bed 2 is a channel-shaped depression 15. A conveyor belt may, for example, be arranged therein, its task being to transport away chips falling down inside the substructure 2 from the machining of a workpiece 16 by metal cutting. For this purpose, the channel 15 is led out on one side of the machine bed 2, preferably diametrically opposite the extension plate 3, to the outside. At this point, the necessary aperture in the substructure is widened in the manner of a passage 17, which allows a person to enter the inner space of the substructure 5.

In the region of the extension 3 on the square main portion 4 of the machine bed 2, by contrast, a gate-like opening 18 is provided in the substructure 5, in order to make it possible for a carriage 20 carrying the machining head 19 to pass through.

For guiding this carriage 20, arranged on the other side of the machine bed 2 are two rails 21, which are parallel to one another, extend from the main portion 4 of the machine bed 2 to the extension 3 thereof and preferably have an undercut cross section, for example of a dovetailed form.

The carriage 20 is guided along these rails 21 by a number of guiding elements on the underside of its approximately rectangular base plate 22, the cross section of which is designed approximately to complement the cross section of the rails, preferably in such a way that the rails 21 are engaged on their upper side by the guiding elements.

For the movement 23 of the carriage 20 in the direction of its guiding rails 21, extending between the same, between the base plate 2-4 and the base plate 22 of the carriage 20, is a spindle 24, which is rotatably mounted in at least one bearing 25 of the machine bed 2, in particular on its extension 3, and is provided with a connection 26 for the coupling of a motor. Fixed to the underside of the carriage 20, in particular to the underside of its base plate 22, is a spindle nut 27, into which the spindle 24 is screwed. Motor-driven rotation of the spindle 24 has the effect of screwing the spindle nut 27 along the spindle 26, mounted undisplaceably in the axial direction 25, and of imparting to the carriage 20 the shift in the direction of the rails 21 that it undergoes thereby. Depending on the direction of rotation of the spindle 26, the carriage 20 thereby moves either through the door opening 18 in the substructure 5 into the inner space 28 thereof or out from it. This is possible because a vertical section through the carriage 20 transversely to its direction of advancement 23 is smaller than the cross section of the door opening 18, so that the carriage 20 fits through it without colliding.

On the base plate 22 of the carriage 20, its structure rises up, comprising an upright, front transverse wall 29, facing the inner space 28, and a rear supporting structure 30. The supporting structure 30 is formed by two supporting walls 31, which extend in the direction of the rails 21 and converge toward one another from the base plate 22 of the carriage 20 to an upper, roof-like connection 32. To reduce the overall weight, the rear end face 33 of the two supporting walls 31 may be angled, for example at an angle of between 30° and 60° with respect to the vertical.

The upright, front transverse wall 29 carries on its front side, facing away from the supporting structure 30-33, two vertical guiding rails, which are parallel to one another and have a rotatably mounted spindle 34 with a vertical longitudinal axis in between. Serving for the motor-driven rotation of the vertical spindle 34 is a drive motor, which is coupled thereto in a rotationally fixed manner and the housing of which may be fixed on the upper side of the base plate 22 of the horizontally movable carriage 20.

A milling head 35 has a rear wall 36, which is parallel to the transverse wall 29 and has guiding elements assigned to this transverse wall 29 for vertically displaceable guidance with respect to the transverse wall 29. When the vertical spindle 34 rotates, a spindle nut 26 is screwed up or down on it and transmits its vertical movement 37 to the vertical slide 35. The milling head 35 is dimensioned such that it is possible to place a circumscribed circle of a diameter much smaller than the diameter of the clearance 41 in the machining table 6, for example only 0.8 thereof or even smaller, in particular only 0.6 thereof or less, around a horizontal section through the head. This produces an adequate freedom of movement in the horizontal direction, within which neither the substructure 5 nor the machining table 6 hinders the horizontal movement of the machining head 19 in the direction of the rails 21.

The machining head 19 carries a cutting tool for machining by metal cutting the inner side of one or more workpieces 16, which are preferably identical and possibly chucked one above the other. Preferred here is a milling cutter 39, which rotates about an axis of rotation 40, cf. arrow 42, which is oriented at right angles to the two directions of carriage advancement 23, 37.

The preferred production method is the profile milling of individual tooth gaps by means of a side-and-face milling cutter 39, the cutting edges of which follow a profile corresponding to the tooth gaps to be milled in; preferably, the cutting edges of the side-and-face milling cutter 39 are arranged on the circumference or lateral side thereof and, according to the profile of the gear tooth or tooth gap to be produced, also extend along the transitional regions to the two end faces of the side-and-face milling cutter 39. With the reciprocating movement 37, the rotating tool 39 is drawn slowly through the inner side of a workpiece 16, so that even a number of workpieces 16 arranged in a stack one above the other can be machined in one operation. After completion of one tooth gap, the milling cutter 39 is moved out from the tooth gap just produced, the entire carriage 20 being moved in the horizontal direction 23; then, the machining table 6 together with the workpiece(s) 16 is turned further by one tooth spacing in the direction of the arrow 43 and then stopped again. Once the side-and-face milling cutter 39 has been moved by means of the carriage 20 onto the inner side of a workpiece 16 again, the milling operation for the next tooth gap begins with the initiation of the reciprocating movement 37.

However, other production methods would also be conceivable, such as for example hobbing or shaping. In such a case, only the machining head 19 would have to be modified, and possibly the program for the activation and coordination of the various drives.

LIST OF DESIGNATIONS 1 machine tool
2 machine bed
3 extension
4 main portion
5 substructure
6 machining table
7 upper side
8 bearing
9 underside
10 clearance
11 wall
12 side edge
13 vaulted portion
14 upper side
15 channel
16 workpiece
17 passage
18 opening
19 machining head
20 carriage
21 rails
22 base plate
23 movement
24 spindle
25 bearing
26 connection
27 spindle nut
28 inner space
29 front wall
30 supporting structure
31 supporting wall
32 roof-like connection
33 end face
34 spindle
35 carriage
36 threaded element
37 vertical movement
38 drive
39 milling cutter
40 axis of rotation
41 clearance
42 arrow
43 arrow
44 terminating ring
45 inner ring
46 projection
47 rolling body
48 rolling body
49 rolling body
50 outer ring
51 upper ring 52 lower ring
53 radially widened region
54 drive
55 electric motor
56 plate-shaped continuation
57 vertical plate
58 side
59 driven shaft
60 gear wheel
61 adaption ring
62 disk-shaped extension
63 machining ring
64 inner cone
65 outer cone
66 receptacle

The invention claimed is:

1. A machine tool for machining gear teeth into an inner side of an annular workpiece, the tool comprising:
a substructure comprising a lateral surface having an upper side comprising a circular ring,
a rotary bearing having two rings rotatable relative to each other,
an annular machining table disposed on said rotary bearing and adapted to support at least one workpiece seated thereon, and
a chassis for supporting a tool head, said chassis extending at least during machining, through the annular machining table, or through a central opening therein, from a bed or pedestal below the machining table,
a plurality of exchangable machining rings, each adapted for a selected workpiece to be machined, with receptacles provided with fastening means on upper sides thereof, and
an adaption ring fixed to an upper side of either one of an inner ring and an outer ring of said rotary bearing and supporting the machining ring,
wherein concentric guiding means defined by an inner cone and an outer cone are provided, one of said inner and outer cones being provided on said adaption ring, and the other one of said inner and outer cones being provided on at least one of said plurality of exchangeable machining rings, and
wherein at least one braking device with movable brake shoes for arresting the machining table is provided, the braking device being adapted to act on a radially outwardly projecting, peripheral collar of said adaption ring.

2. The machine tool in accordance with claim 1, wherein the adaption ring is provided in its planar upper side with fastening bores disposed in the form of a ring, which are adapted to serve for screwing on a placed-on, workpiece-specific machining ring of the plurality of exchangeable machining rings.

3. The machine tool in accordance with claim 1, wherein different machining rings of the plurality of exchangeable rings are adapted with regard to their inside diameters to different workpieces, and/or are provided with upper side receptacles for fastening means for the connection to one or more workpieces stacked one above the other, in the form of threaded rods inserted through connection bores, wherein the receptacles are provided with an internal thread.

4. The machine tool in accordance with claim 1, wherein the adaption ring and a placed-on, workpiece-specific machining ring of the plurality of exchangeable machining rings are self-centering by means of the concentric guiding means defined by an inner cone and an outer cone, whereby one of said inner and outer cones is provided on said adaption ring, and the other one of said inner and outer cones being provided on at least one of said plurality of exchangeable machining rings.

5. The machine tool in accordance with claim 1, wherein the moveable brake shoes of the at least one braking device for arresting the machining table are hydraulically or electrically actuable and preferably act on a peripheral collar projecting radially outwardly from the adaption ring.

6. The machine tool in accordance with claim 1, wherein the machining table is mounted rotatably about a vertical axis in which the machining table is mounted, on an upper side of a substructure with a form of a jacket, wherein the substructure for the machining table is provided in a region of an upper side thereof with a cross section in a form of a circular ring having a circular outer contour in which the substructure for the machining table is provided, in the region of the bed, facing the machine bed or pedestal, or arranged on the machine bed or pedestal, a generally polygonal cross section.

7. The machine tool in accordance with claim 6, wherein the generally circular outer contour of the substructure, or the cross section of the substructure, on its upper side, extends over the outer contour of the substructure or the cross section thereof at its base, and wherein the edge length of the substructure at the base of the substructure corresponds to the diameter of the circle at the upper side of the substructure, wherein preferably the circle at the upper side of the substructure forms in a projection onto the base an inscribed circle in the square at the base of the substructure, which preferably has the same center point as the square and tangentially contacts the side edges of the square at their midpoint.

8. The machine tool in accordance with claim 7, wherein
(i) in regions of four first points on the generally circular upper side, which points are offset by 90° from one another, the wall or outer surface of the substructure extends to the base of the substructure along vertical lines or along lines with an angle of slope which is greater than all other lines of the wall or outer surface of the substructure, wherein,
(ii) in regions of four second points on the generally circular upper side that lie, respectively, between two of the first points to the base of the substructure, along lines with an angle of slope which is smaller than all other lines of the wall or outer surface of the substructure, and
(iii) at varying angles of slope between the first points and the second points.

9. The machine tool in accordance with claim 6, wherein the substructure has a wall thickness of 10-50 cm and supports on its upper side a solid terminating ring fixed thereon, to which one of said inner ring or outer ring of the rotary bearing is fixed, wherein on that one of said inner ring or outer ring of the rotary bearing which is rotatable with respect to the substructure, peripheral teeth are provided with which a toothed element that is driven meshes.

10. The machine tool in accordance with claim 6, wherein the chassis for holding, supporting, mounting and guiding the tool head is provided with a horizontally movable carriage guided on the machine bed or pedestal, by means of guiding rails.

11. The machine tool in accordance with claim 6, wherein the chassis for holding, supporting, mounting and guiding a tool head is provided with a vertically movable carriage, which is guided on a horizontally movable carriage, wherein the vertically movable carriage is formed as a milling head.

12. The machine tool in accordance with claim 11, wherein a milling tool is mounted rotatably about a horizontal axis of rotation, wherein the axis of rotation of the milling tool, the direction of displacement of the vertically movable carriage and the direction of displacement of the horizontally movable carriage respectively form a right angle to one another.

13. A machine tool for incorporating gear teeth into an inner side of an annular workpiece, the machine tool comprising a lateral surface having a side in the form of a circular ring, a rotary bearing thereon having two rings rotatable relative to each other, and on which an annular machining table is disposed and adapted for supporting at least one workpiece seated thereon, and a chassis for supporting a tool head, said chassis extending, at least during machining, through the annular machining table, or through a central opening in the annular machining table from a bed or pedestal below the machining table; wherein a selected machining ring adapted for a selected workpiece to be machined is provided with fastening means on its upper side, and an adaption ring fixed to an upper side of either one of an inner ring and an outer ring of the rotary bearing supports the machining ring, wherein concentric guiding areas in the form of an inner cone and an outer cone are provided, one of said inner and outer cones being provided on the adaption ring and the other one of said inner and outer cones being provided on at least one of said plurality of exchangeable machining rings, and wherein a braking device with movable brake shoes for assisting the machining table is provided, the braking device being adapted to act on a radially outwardly projecting peripheral collar of the adaptation ring;

wherein the machining table is mounted rotatably about a vertical axis in which the machining table is mounted, on an upper side of a substrate in the form of a jacket, wherein a substructure for the machining table is provided in a region of an upper side thereof with a cross section in the form of a circular ring having a circular outer contour, in which the substructure for the machining table is provided with, in the region of the bed, facing the machine bed or pedestal, a generally polygonal cross section; and the cross section or the center contour of the substrate for the machining table changes between an upper side and the bed; and wherein the generally circular outer contour of the substructure or of the cross section of the substructure, on its upper side extends over the outer contour of the substructure or the cross section thereof at its base; and wherein the edge length of the square at the base of the substructure corresponds to the diameter of the circle at the upper side of the substructure or the circle at the upper side of the substructure forms in the projection onto the base an inscribed circle in the square at the base of the substructure or has the same center point of the square and tangentially contacts the side edges of the square at their midpoints.

14. The machine tool in accordance with claim 13, wherein
(i) in regions of four first points on the generally circular upper side that are respectively offset by 90° from one another, the wall or outer surface of the substructure extends to the base of the substructure, along vertical lines or along lines with an angle of slope which is greater than all other lines of the wall or outer surface of the substructure; wherein
(ii) in regions of four second points on the generally circular upper side that lie, respectively, between two of the first points, the wall or outer surface of the substructure extends to the base of the substructure, along lines with an angle of slope which is smaller than all other lines of the wall or outer surface of the substructure; and
(iii) at varying angles of slope between the first points and the second points.

15. The machine tool in accordance with claim 13, wherein the lateral area, or outer area, of the substructure comprises an alternating succession of upright, preferably isosceles, triangle portions, and in between, in each case, a portion of an inverted cone, wherein an edge line of a triangle portion coincides with an edge line of a cone portion.

16. The machine tool in accordance with claim 13, wherein the wall or outer surface of the substructure is provided with four planar side walls or with four planar and vertical side walls, which at the base of the substructure, or lateral surface, meet edges of a quadrangle, and four vaulted portions comprising curved intermediate walls that join the four planar wall portions or the four planar and vertical wall portions, or side walls to one another.

17. The machine tool in accordance with claim 16, wherein the vaulted portions or curved intermediate walls narrow toward the base and end in the form of points in base corners, and widen upwardly toward the upper side and come together in a region of the upper side.

18. The machine tool in accordance with claim 16, wherein the four planar side walls or the four planar and vertical side walls narrow to a point at the upper side of the substructure.

* * * * *